United States Patent

Werges

[11] 3,900,516
[45] Aug. 19, 1975

[54] PROCESS FOR MAKING ACRYLAMIDE

[75] Inventor: Darrell L. Werges, Park Forest, Ill.

[73] Assignee: Nalco Chemical Company, Chicago, Ill.

[22] Filed: Nov. 1, 1973

[21] Appl. No.: 411,821

[52] U.S. Cl....... 260/561 N; 252/477 Q; 260/557 R
[51] Int. Cl.......................................... C07c 103/08
[58] Field of Search........ 260/561 R, 558 R, 561 N, 260/557 R; 252/476, 477 Q, 463; 75/139

[56] References Cited
UNITED STATES PATENTS

| | | | |
|---|---|---|---|
| 3,696,152 | 10/1972 | Habermann et al. | 260/561 R |
| 3,767,706 | 10/1972 | Habermann et al. | 260/561 N |

*Primary Examiner*—C. Davis
*Attorney, Agent, or Firm*—Hill, Gross, Simpson, Van Santen, Steadman, Chiara & Simpson

[57] ABSTRACT

A continuous process for catalytically hydrolyzing acrylonitrile to acrylamide under liquid phase conditions. A concentrated, two-phase acrylonitrile/water feed is sequentially passed in a plug flow manner through at least two tubular reaction zones at a temperature of from about 100° to 300°F using a weight hourly space velocity of from about 0.1 to 10. Each zone has a fixed catalyst bed of prechosen minimum initial activity. Total system conversion of starting acrylonitrile to acrylamide of at least about 60 percent is achieved. The product concentrated aqueous solution of acrylamide may be used as such or subjected to a brief stripping operation to recover unconverted acrylonitrile.

34 Claims, 4 Drawing Figures

PROCESS FOR MAKING ACRYLAMIDE

BACKGROUND OF THE INVENTION

In the art of catalytically hydrolizing acrylonitrile with water to acrylamide two routes have heretofore been taught. One route involves a dilute (7 weight percent being typical) aqueous solution of acrylonitrile and water being hydrolyzed to acrylamide with a copper catalyst system, such as a reduced copper containing catalyst, or a mixture of copper oxide with silver, zinc, or cadmium oxides (see U.S. Pat. Nos. 3,597,481; 3,631,104; and 3,642,894; and West German DOS 2,001,903, all apparently assigned to Dow Chemical Company, Midland, Michigan). The other process involves a continuous conversion in which the catalyst is suspended in an acrylonitrile/water system in the circulation zone of a reactor using in one mode a reactor especially designed so that the suspended catalyst can be separated from the reactant liquid in a catalyst precipitation zone which is so constituted that it is essentially connected with a reaction zone. (See West German DOS 2,240,783 and also West German DOS 2,241,732 apparently assigned to Mitsui Chemical Company, Tokyo, Japan).

Each of these processes suffers from serious disadvantages. In the case of the Dow process, according to the examples in the patents cited, a product solution containing only about 8.4 weight percent (wt. %) acrylamide is typically produced at 90 wt. % conversion of acrylonitrile to acylamide from a 7 wt. % acrylonitrile feed. To concentrate such a solution to a desired concentrated product aqueous solution containing 50 wt. % acrylamide, it is necessary to evaporate about 9.8 pounds of water per pound of acrylamide. Such an evaporation procedure requires specialized apparatus, such as a stripper or evaporator, and involves costly inefficient operating conditions.

Concentrated solutions of acrylamide in water are desired because such solutions can then be employed directly for the manufacture of aqueous polyamide latex polymer formulations. Also, when an aqueous solution of acrylamide is to be an item of commerce, the most concentrated possible solution is desired in order to minimize shipping costs (owing to inherent water content). Even if one desired to sell acrylamide as a crystalline solid product, which is the way a substantial quantity of acrylamide is apparently currently sold commercially, it would be necessary first to crystalize the acrylamide from a dilute starting aqueous solution prepared by catalytic hydrolysis. Since the solubility of acrylamide in water is relatively high, a concentrated solution feed is required for a crystallization process so a costly evaporation step would still be needed. Consequently, there is a need in the art for a process which will permit one to make with as little stripping as possible concentrated solutions of acrylamide and water.

In the case of the Mitsui process, a back-mixed, suspension-type reactor system is employed. In the hydration of acrylonitrile to acrylamide, the reaction rate inherently decreases with increasing conversion percentages so that a back mixed reactor design results in the largest possible reactor or catalyst charge for a given degree of conversion of acrylonitrile to acrylamide. Thus, by this process, it is particularly difficult to achieve high conversion levels particularly at high reaction rates. Observe that the Mitsui examples show only about a 50 percent conversion and a reaction product containing only about 20% acrylamide, so that, for producing a concentrated product, a relatively large amount of water and acrylonitrile must be evaporated. Another problem with the Mitsui process arises because of the unavoidable apparent consumption of catalyst owing to the inherent generation of catalyst fines which are not separable in the catalyst recovery portion of the Mitsui suspension reaction system.

Nothing in the prior art processes for catalytically hydrolyzing acrylonitrile to acrylamide teach the use of a concentrated acrylonitrile starting feed with water charged to a reactor and the direct production of a high purity, concentrated product aqueous solution of acrylamide in water which requires little, if any (depending upon type of product desired), subsequent stripping to remove unreacted acrylonitrile and excess water. Nothing in the prior art permitted the use of a combination of high conversion percentages with highly concentrated starting feeds carried out at relatively rapid reaction rates.

The problem of producing directly a concentrated solution of acrylamide and water has proven to be difficult to solve, for it is not possible simply to increase the concentration of acrylonitrile and water in a starting feed of acrylonitrile/water being fed to a continuous prior art reactor. Thus, for one thing, it is difficult to control in a reaction zone the hydrolysis reaction occurring in such a concentrated feed because of the characteristically high exotherm and the high initial rate of reaction associated therewith. For another thing, so far as is known, the catalysts heretofore chosen for use in the prior art processes did not have appropriately high catalytic activity of the type needed for high conversion rates when placed into a fixed bed in a substantially isothermal reactor and subjected to plug flow type movement of reactants therethrough.

Production of a concentrated acrylamide solution in a reactor which is approximately plug flow causes several problems which are unique to operating in this manner. For one thing, one must employ a reaction zone from which heat may be removed continuously and at a high rate. For example, if one has a dilute reactor feed of 7 percent acrylonitrile in water, sufficient water is available as a heat sink to eliminate the need for heat removal from the reactor, but in contrast, for a 35 weight percent acrylonitrile/water feed reacted to a 90 percent conversion, there is an adiabatic temperature rise of 200°F. which results in such a high reactant temperature that undesirable side reactions inherently occur (such as polymerization) so that, under such latter process conditions, heat must be removed during the hydrolysis reaction. While it is possible to prevent the initial uncontrolled temperature rise by conducting the reaction at a low temperature where the initial rate would be slow enough to allow close control of the initial exotherm, unfortunately, if the entire reaction is conducted at this temperature, the reaction rate above about 60 percent conversion becomes so slow that an impractically large bed of catalyst is required to achieve high conversion levels and high acrylamide concentrations.

Another problem arises from the discovery that, at acrylonitrile conversion levels of up to about 30 percent with concentrated acrylonitrile feeds, the reaction rate is suprisingly higher than the reaction rate above conversion levels of about 60 percent. Thus, if one attempts to conduct such a hydrolysis reaction in a single reaction zone to a conversion level of, say, about 80 percent it becomes necessary to use a high reaction zone temperature to compensate for the reduced conversion rates above about 60 percent. Such a high temperature results in a virtually uncontrollable exotherm in the initial phases of the reaction owing to the much faster rates of conversion at such lower initial levels of conversion. On the other hand, if one attempts to perform the initial phases of the hydrolysis reaction in a controllable manner using a concentrated acrylonitrile feed in a single reactor by operating at low temperatures, then the reactor needed to achieve a high conversion such as 80 percent can become extremely large due to the low reaction rates above about 60 percent conversion. This effect is considerably greater than would be expected from simple depletion of acrylonitrile reactant, and it appears that high concentrations of acrylamide may inhibit the further conversion of acrylonitrile. Consequently, simultaneously achieving a high degree of conversion and a high acrylamide concentration presents a particularly difficult problem.

Still another problem is that, when one uses a concentrated acrylonitrile/water starting feed, there is inherently a two-phased system involved owing to the limited solubility of acrylonitrile and water. If one uses, for example, a tubular reactor having a plurality of spaced, parallel tubes, it becomes difficult to uniformly provide to each of these reactor tubes an identical two-phased mixture of acrylonitrile and water. Those tubes which happen to receive a higher concentration of acrylonitrile then develop an even higher exotherm than do the tubes which receive an average or lower than average quantity of acrylonitrile which aggravates the difficulties of obtaining controllable reaction conditions particularly in initial reaction phases.

So far as known, no one has heretofore discovered a commercially practical, continuous process for fixed catalyst bed acrylonitrile hydrolysis using a two-phase, concentrated, acrylonitrile-rich starting feed stream, substantially plug flow of reactants, and a maximized, weight-hourly space velocity for the reactant composition which results in a minimum catalyst bed volume.

BRIEF SUMMARY OF THE INVENTION

This invention is directed to a new and very useful process for catalytically hydrolyzing acrylonitrile to acrylamide under liquid phase conditions. A concentrated acrylonitrile/water mixture is continuously passing sequentially through at least two tubular reaction zones in a plug flow manner. The process overcomes shortcomings of the prior art and problems associated with the hydrolysis of acrylonitrile under conditions of high levels of conversion and rapid rates of reaction using a concentrated, two-phase starting feed of acrylonitrile and water. The process produces a concentrated solution of acrylamide in water.

An object of this invention is to provide a process for catalytically hydrolyzing such a concentrated feed under liquid phase conditions at relatively high conversion (e.g. typically above about 60 percent though lower rates can also be used) and relatively high reaction rates and which can be operated for extended periods of time.

Another object is to provide a multistage process for producing concentrated aqueous solutions of acrylamide by direct catalytic hydrolysis of acrylonitrile using a minimized reactor volume for a given production rate within the constraint that the reaction temperatures are easily controlled.

Another object is to provide a practical process of the type indicated which overcomes the problems associated with catalytically hydrolyzing concentrated acryonitrile/water systems to acrylamide continuously at high conversion and at high rates.

Another object is to provide a commercially practical continuous process for fixed catalyst bed hydrolysis of acrylonitrile with water to acrylamide using a two phase, acrylonitrile rich feed stream, a maximizable weight hourly space velocity, a maximizable conversion of acrylonitrile to acylamide, a minimizable catalyst bed volume, and a maximizable overall reaction rate.

Another object is to provide such a continuous process wherein a plurality of reaction zones (preferably similar) are used (e.g. two, three or four, as desired), and, further, wherein each reaction zone of such plurality may optionally be utilized under varying process conditions by changing reactor zone sequence while the process is being continuously operated.

Another object is to provide such a process wherein one or more of a plurality of reaction zones may be temporarily removed from service, as for repacking with fresh catalyst, without process shut down, by reducing weight hourly space velocity, and/or increasing the respective zone temperatures, even though in these situations process efficiency is thereby reduced.

Another object is to provide in a continuous such process a technique for minimizing production problems without a complete process shut down caused by catalyst deactivation owing to what may be the characteristic tendency for a catalyst to deactivate more rapidly near a fresh feed inlet than in downstream locations relative thereto.

Another object is to provide such a process which is easy, reliable and simple to control, and where little or even substantially no side reactions occur, and where conventional simple, economical, apparatus may be employed for conducting the process.

Another object is to provide such a process which uses relatively low, substantially isothermal, liquid phase temperature conditions over a plurality of plug-flow, continuously operating, reaction zones and wherein each zone can comprise a plurality of tubular spaces wherein feed phase distribution problems are minimizable.

Another object is to provide such a process which uses a catalyst presently (preferably copper) having a level of initial conversion activity which exceeds a minimum level.

Another object is to provide such a process wherein the level of conversion of acrylonitrile to acrylamide is such that a concentrated (e.g. above about 30 to 35 wt. % total weight basis) solution of acrylamide is directly produced by hydrolysis.

Another object is to provide such a process wherein conversion can be carried to the point where the product solution needs little or no stripping to remove unreacted acrylonitrile before use, and wherein, even after stripping, a concentrated product acrylamide solution (e.g. above about 40 to 45 wt. % total weight basis) of high purity is produced.

Other and further objects, purposes, advantages, utilities, and features will be apparent to those skilled in the art from a reading of the present specification and drawings.

DETAILED DESCRIPTION

Figure 1:
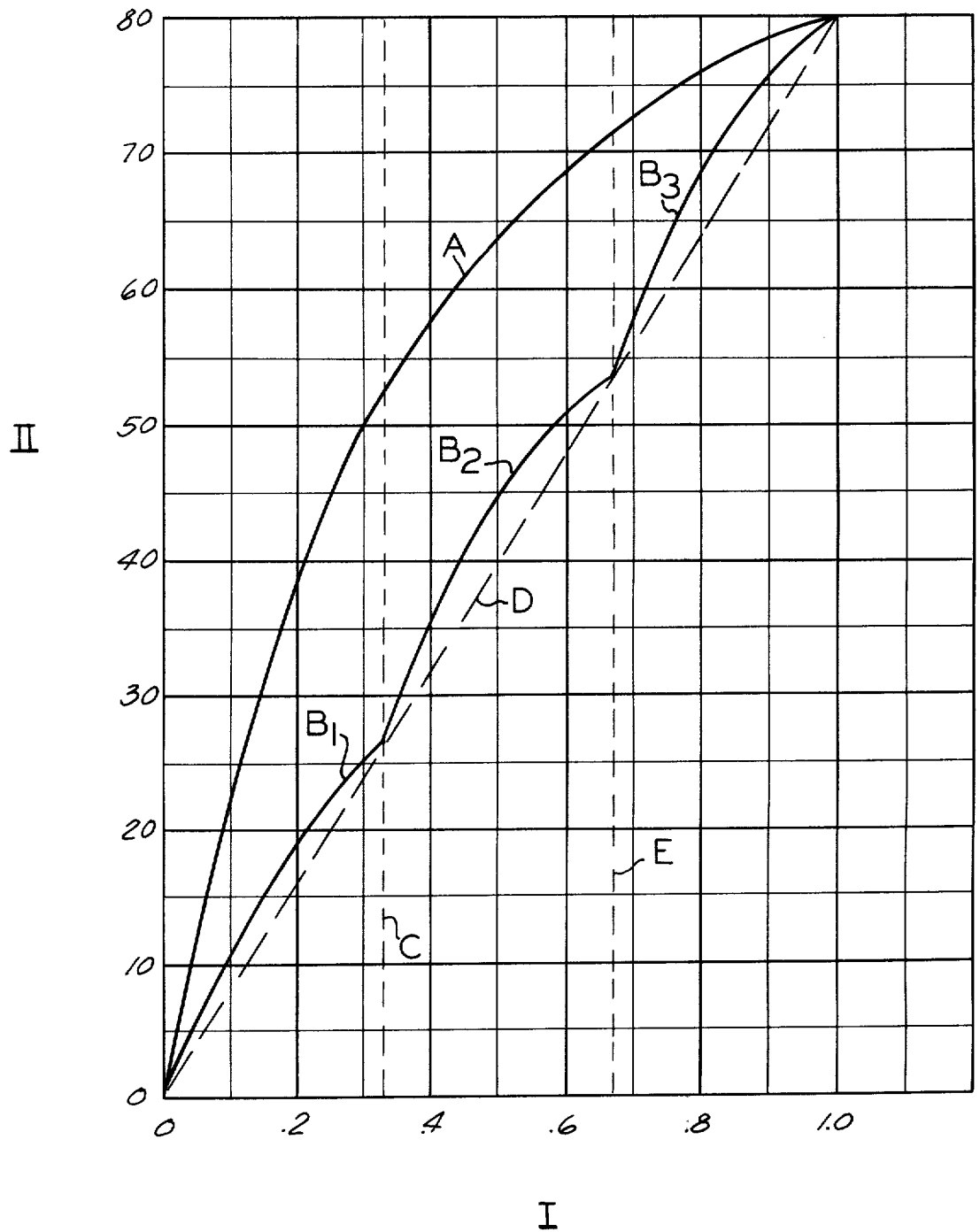
FIG. 1 provides illustrative plots showing the percent conversion of acrylonitrile to acrylamide as ordinates (II) against contact line in hours (shown as the reciprocal of weight hourly space velocity) as abscissae (I)

In the process of this invention, the reactant feed composition is liquid and comprises from about 25 to 75 wt. %. (preferably about 30 to 40 wt. %) acrylonitrile and from about 25 to 75 wt. % (preferably about 60 to 70 wt. %) water on a 100 wt. % total reactant feed composition basis.

Each one of the plurality of reaction zones contains a fixed catalyst bed. The catalyst comprising each of such beds is characterized by having an initial activity of at least about 0.25 based upon a starting feed composition of 35 wt. % acrylonitrile and 65 wt. % water, total composition basis, using a catalyst bed volume of about 50 cubic inches and a weight hourly space velocity which is sufficient to produce about 80 percent conversion of acrylonitrile to acrylamide (see procedure in Example 1 below).

This process is conducted substantially isothermally at temperatures in the range of from about 100° to 300°F. (preferably from about 150° to 260°F.) and using a system weight hourly space velocity in the range of from about 0.1 to 10 hours$^{-1}$ (preferably from about 0.5 to 2 hours$^{-1}$).

The process uses in a total system conversion of starting acrylonitrile to acrylamide of at least about 60 percent (and preferably at least about 75 percent). Preferably, each of the reaction zones is maintained at a substantially constant temperature, and preferably each successive reaction zone is maintained at a higher temperature than the preceding reaction zone.

The interrelationship between the weight hourly space velocity and the temperature, respectively, in each one of said reaction zones is such that the percentage conversion of acrylonitrile to acrylamide in each one of such reaction zones ranges from about 0.5 to 1.5 times said total system conversion divided by the total number of said reaction zones (and preferably from about 0.7 to 1.3 times).

Preferably, the process is conducted using two, three, or four sequential reaction zones, though more can be used if desired.

The catalyst used in the process typically has an activity of not more than about 2 (though more active catalysts can be used), and, preferably, such activity is in the range from about 0.45 to 1.5. Typically the catalyst is in the form of particles ranging in size from about 0.01 to 0.49 inch, and preferably ranging in size from about 0.02 to 0.3 inch. Generally, any catalyst having such characteristics may be used. Presently, such catalyst is preferably a copper containing catalyst, and, more preferably, is a Raney copper catalyst.

Typically, a product produced by the process of the invention comprises on a 100 weight percent basis from about 30 to 60 weight percent acrylamide, from about 1 to 20 weight percent acrylonitrile, and from about 40 to 65 weight percent water, and, preferably, from about 35 to 50 weight acrylamide, from about 2 to 10 weight percent acrylonitrile, and from about 40 to 60 weight percent water. Obviously, as those skilled in the art will appreciate, while one can prepare by the process of this invention relatively dilute aqueous solutions of acrylamide, a preference, and, indeed, a primary aim of this invention, is to permit one to prepare such aqueous solutions directly in a highly concentrated form. A limiting factor in a product solution comprises, of course, solubility limits of acrylamide in water at particular conditions, such as room temperatures.

A product liquid mixture produced by the process of this invention is preferably subjected to stripping to recover therefrom unreacted acrylonitrile. Conveniently, recovered acrylonitrile is recycled back to at least one of the reaction zones. Preferably recovered acrylonitrile is recycled back to the first of said reaction zones in admixture with said feed composition. Typically, such stripping is carried out at temperatures ranging from about 40°C to 100°C. at pressures ranging from about 50mm to 760mm (times of less than about 8 hours are preferred). Typically, the so stripped product comprises, on a 100 wt. % basis, from about 40 to 60 wt. % acrylamide and from about 40 to 60 wt. % water, and, preferably, from about 45 to 55 wt. % acrylamide with the balance up to 100wt. % being water though higher (and lower) acrylamide contents can be achieved if desired.

In practicing the present invention, the initial or first reaction zone is preferably maintained at a relatively low temperature so as to conduct the first part of the reaction at a rate which allows closely controlling temperature. The later zone or zones use high temperatures to speed up the reaction and achieve the desired high conversion levels in preferably a minimum overall catalyst volume. Two sequential reaction zones at different temperatures are sufficient to allow good temperature control and minimum bed volume. The zones do not necessarily have to be in separate reactors, but can be in a single reactor with, for example, two separate jackets each with a different coolant temperature.

The use of three or more separate reactors has a number of advantages primarily related to flexibility in a commercial plant. Three reactors have the advantage that if one reactor is shut down for maintenance, the other two can still be run in a manner which allows good temperature control. Four or more reactors can obviously be used, but for an initial design this could represent an unnecessary complication. The use of four or more reactors is primarily important as a convenient method of future plant expansion, as those skilled in the art will appreciate.

It is expected that the catalyst in the first reaction zone will normally deactivate more quickly than the catalyst in the subsequent reaction zone because, for one thing, the first reaction zone is subjected to impurities present in the feeds, such as dissolved oxygen, metal ions in the water, and possible organic contaminants present in the acrylonitrile. While ideally such contaminants could be controlled at low levels, plant practice is not ideal and impurities will occassionally be introduced into the reaction zones.

The reaction zones employed in the process of this invention are preferably of the conventional shell and tube reactor design. The catalyst is packed inside the tube or tubes and the exothermic hydration reaction is accomplished inside the tubes while a cooling medium is circulated through the shell side to remove the heat of reaction and ideally maintain approximately isothermal conditions in the catalyst bed. Small scale operations within the teachings of this invention have been successfully conducted in but a single tube reactor used as a reaction zone. Large commercial scale operations require typically a bundle of at least 50 tubes, preferably more, to keep tube length to a practical value, for each reaction zone.

Figure 3:
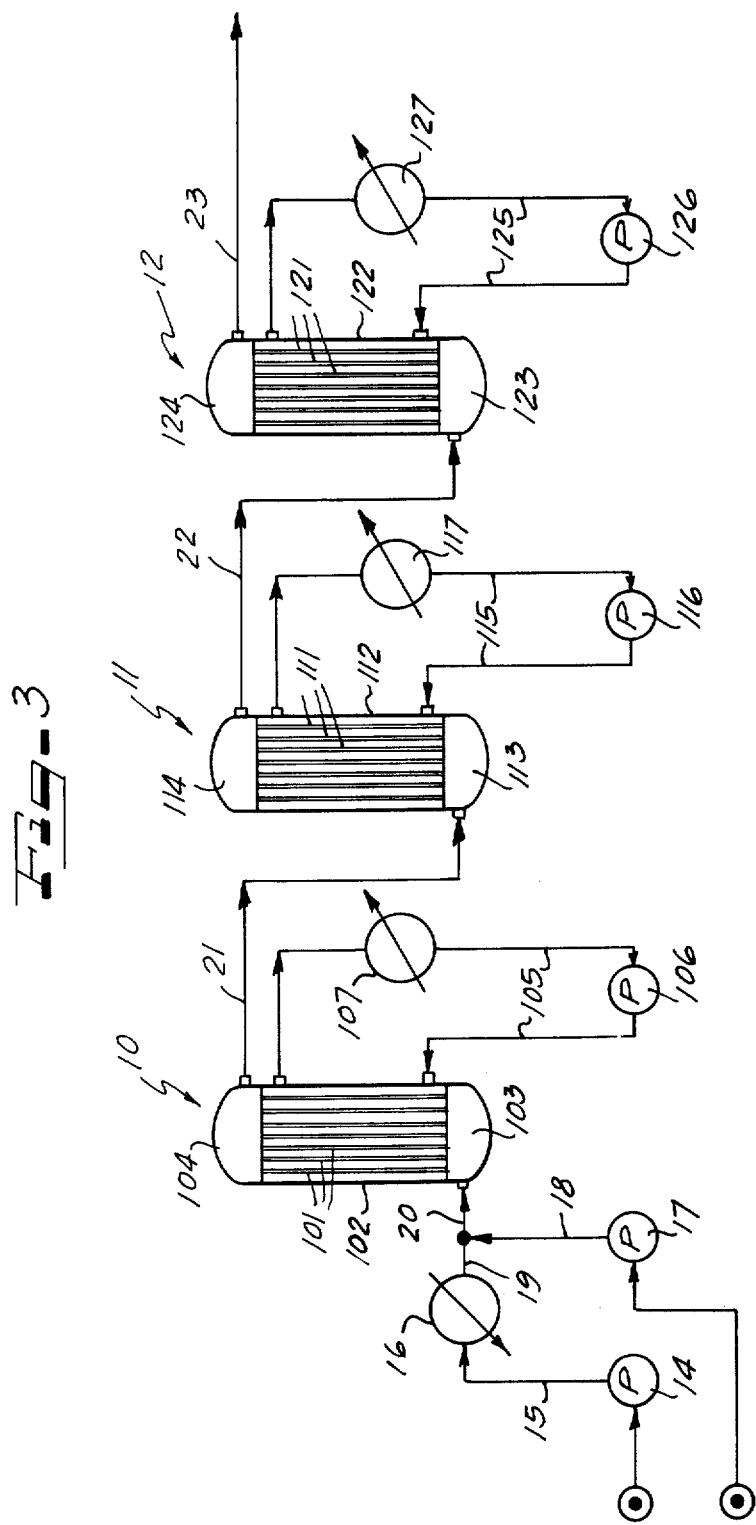
FIG. 3 is a diagrammatic process flow sheet illustrating an embodiment of the present invention.

Referring to the drawings, there is seen in FIG. 3 a process flow diagram of one embodiment of the present invention. Thus, the embodiment employs three shell and tube type reactors 10, 11 and 12 each of which is similarly constructed and similarly sized to the others thereof and each of which is adapted for maintenance of isothermal reaction conditions. Each reactor 10, 11 and 12 is equipped with a plurality of tubes 101, 111, and 121, respectively, conventionally disposed in spaced parallel relationship with respect to each other within respective shells 102, 112 and 122. Opposite ends of each set of tubes 101, 111, and 121 interconnect with a header or chamber 103, and 104, 113 and 114, and 123 and 124, respectively. Cooling fluid, such as water or the like, is circulated within shells 102, 112, and 122 by means of conduits 105, 115, and 125, respectively, and cooling pumps 106, 116 and 126, respectively, with the cooling fluid being cooled to a predetermined temperature by means of coolers 107, 117, and 127, respectively, whereby the tubes 101, 111, and 121 are maintained at substantially isothermal, constant, preset temperature during operation of reactors 10, 11 and 12, as those skilled in the art will appreciate. Each of the tubes 101, 111, and 121 is charged with granules of a Raney copper catalyst having in each instance, an initial catalytic activity as indicated hereinabove. This catalyst is in the form of granules as indicated hereinabove.

In operation, water is pumped by a pump 14 through a conduit 15, preferably in a deionized, deaerated condition, through a variable steam preheater 16 wherein the water is preheated to a predetermined temperature. Acrylonitrile is pumped by a pump 17 through a conduit 18 to interconnection with a heated water conduit 19 after which the combined mixture is fed through a conduit 20 into a chamber 103 of reactor 10. The mixture of reactant composition then passes through tubes 101 and into chamber 104, from which the resulting reactant composition is conveyed by a conduit 21 to chamber 113 of reactor 11. The reactant composition then passes through tubes 111 and into chamber 114 from which the resulting reactant composition is conveyed by a conduit 22 to chamber 123 of reactor 12. The reactant composition then passes through tubes 121 and into chamber 124 from which the resulting reactant composition is conveyed away by a conduit 23. In conduit 23, the resulting reactant composition is conducted to storage or a subsequent processing station, such as a stripping zone as indicated hereinabove to produce a desired purified acrylamide in water solution.

The use of multiple reactors in a series has the advantage of only changing a catalyst which is most severely de-activated rather than changing all of the catalyst, as would be necessary if only one reactor is used. This extends the overall useful life of a catalyst in the later stages and encourages long continuous runs.

An additional advantage is obtained by rotating the reactors with catalyst charges so the newest, most active catalyst may be always in the last reactor, and the oldest, least active catalyst may be in the first reactor. The first part of the reaction is inherently fast, and a highly active catalyst is not required in the first stage. The last stage has the inherently slowest reaction rates which occur above the aforeindicated 60 percent conversion, so the most active catalyst is best used in this stage.

To illustrate how this is accomplished, assume three reactors have been operating in order 1-2-3. Reactor 1 catalyst deactivates, so it is pulled out of the system and recharged. While reactor 1 is down, the remaining reactors operate in order 2-3. Reactor 1 is brought back into the system so operation is in order 2-3-1. With the passage of time reactor 2 deactivates and it is pulled out of the system. While reactor 2 is recharged the remaining reactors operate in order 3-1. Reactor 2 is brought back into the system so operation is in order 3-1-2. Subsequent cycles continue to follow.

Figure 4:
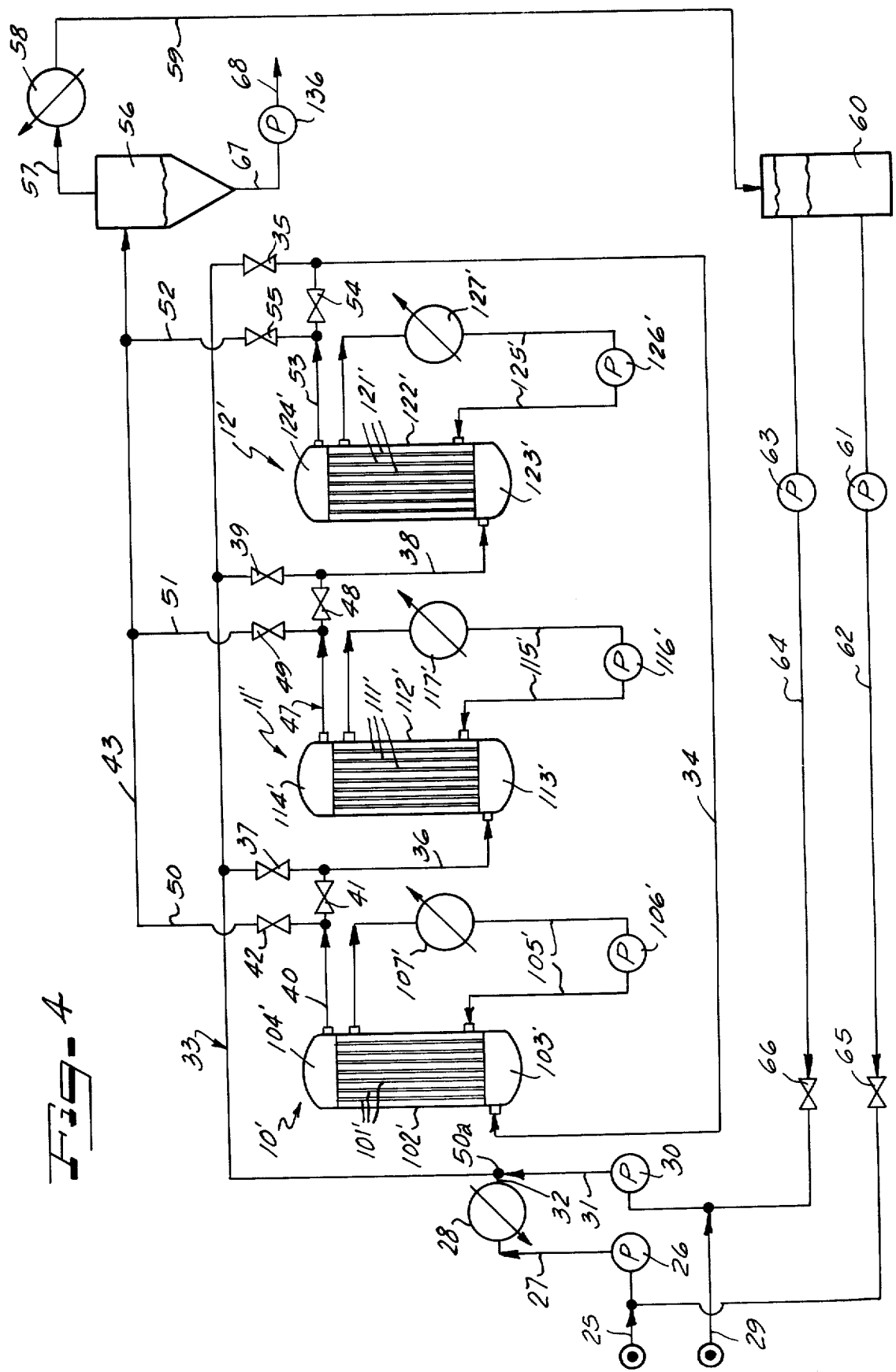
FIG. 4 is a view similar to FIG. 2 but showing a preferred embodiment.

In FIG. 4 is seen a process flow diagram for such a preferred embodiment of the present invention. Here again, three shell and tube type reactors are employed which can be similar to those employed in the FIG. 3 apparatus, and which are numbered similarly to such, but with the addition of prime marks thereto, including cooling pumps, coolers and associated conduits, and which have their respective tube 101', 111', and 121' similarly packed with Raney copper catalyst granules. Water is charged from a feed conduit 25 by pump 26 through conduit 27, preferably in a deionized, deaerated condition, through a variable steam preheater 28 wherein the water is preheated to a predetermined temperature. Acrylonitrile is charged from a feed conduit 29 by pump 30 through conduit 31 to an interconnection 50a with heated water conduit 32 from which the resulting mixed reactant composition enters conduit 33. Conduit 33 interconnects with input conduit 34 of reactor 10 through valve 35, with input conduit 36 of reactor 11' through valve 37 and with input conduit 38 of reactor 12' through valve 39.

In operation, for example, when it is desired to use reactor 10' as the first reactor, reactor 11' as the second reactor, and reactor 12' as the third reactor, one closes valves 37 and 39 and opens valve 35 so that reactant composition or fluid flows through conduit 33 and conduit 34 into and through the tubes 101' of reactor 10' and out through output conduit 40. Conduit 40 joins conduit 36, and valve 41 therebetween is here opened, so that reactant composition flows through open valve 41 into input conduit 36, valve 42 being closed. After passage through the tubes 111 of reactor 11', the reactant fluid exits through output conduit 47. Conduit 47 joins conduit 38, valve 48 therebetween being open, so that reactant composition flows through open valve 48 into input conduit 38, valve 49 being closed. After passage through the tubes 121' of reactor 12', the reactant fluid exits through output conduit 53 and enters conduit 52, the valve 55 being open and the valve 54 being closed.

Conduit 52 joins transfer conduit 43, valve 55 therebetween being here opened so that reactant composition flows through conduit 52 into conduit 43 from conduit 53 and then into a flash tank 56. In place of flash tank 56, one can employ any convenient distillation, stripping, or evaporation apparatus, or some combination thereof as those skilled in the art will appreciate. From flash tank 56 vaporized water and acrylonitrile pass through conduit 57 into condenser 58 and the condensate passes through line 59 into decator 60 where the acrylonitrile phase is separated from the water phase. The water phase is pumped through pump 61 via conduit 62 back to interconnection with water input line 25 to complete recycle of the water phase while the acrylonitrile phase is pumped via pump 63 through line 64 back to interconnection with acrylonitrile input line 29 to complete recycle of the acrylonitrile phase. Amount of recycle of water phase and of acrylonitrile phase can be controlled by respective valves 65 and 66.

The acrylamide product solution leaves flash drum 56 via conduit 67 and is pumped by a pump 136 through conduit 68 to subsequent storage or a polymerization process, all as desired.

Alternatively, in operation, for another example, when it is desired to use reactor 11' as the first reactor, reactor 12' as the second reactor, and reactor 10' as the third reactor, one closes valves 35 and 39 and opens valve 37 so that reactant composition flows through conduit 36 from conduit 33 into and through the tubes 111' of reactor 11' and out through output conduit 47, valve 41 being closed. From output conduit 47, reactant composition flows through open valve 48 into conduit 38, valve 49 being closed, and hence into and through the tubes 121' of reactor 12' and out through output conduit 53. From output conduit 53, reactant composition flows into input conduit 34 of reactor 10', valve 55 being closed, and hence into and through the tubes 101' of reactor 10' and out through output conduit 40. From output conduit 40, reactant composition flows through open valve 42 first into and through conduit 50 and then into conduit 43 and into flash tank 56, wherein flashing occurs as described above.

In the same manner, any desired sequence of three reactors may be employed in the practice of this invention; thus, in addition to the above, the sequence 12', 10', 11' can be used in the illustrated embodiment of FIG. 4.

If in operation, one of the reactors 10', 11' or 12' is to be removed from service for some purpose temporarily, the other such reactors can continue to operate. For example, if reactor 11' is bipassed, reactor 12' used as the first reactor and reactor 10' used as the second reactor, one closes valves 37, 35 and 48 so that reactant composition flows from conduit 33 into input conduit 38 of reactor 12' and hence through the tubes 121' thereof and out through output conduit 53. With valve 54 open and valve 55 closed reactant composition passes from conduit 53 into conduit 34 and hence through the tubes 101' of reactor 10' and out through output conduit 40. With values 41 and 49 closed, reactant composition moves from conduit 40 through open valve 42 and conduit 50 into conduit 43 and hence into flash tank 56 wherein flashing occurs as described above. Similarly, any sequence of two reactors of such a three reactors series, may be employed in the practice of this invention; thus, in addition to the above, the sequences 10', 11' and 11', 12' can be employed in the embodiment illustrated in FIG. 4.

In reactors 10, 11 and 12, or in reactors 10', 11' and 12' any convenient combination of tube inside diameter and tube length which will satisfy the above indicated process parameters may be employed, though, for reasons of process convenience, each reactor in a series of three is equipped with tubes of dimensions substantially equal to those used in the other reactors of such series, stainless steel being a convenient construction material. Each reactor can be a single tube or a multiplity of tubes. In one preferred form of process as shown in FIG. 7, for example, the tubes can have a length of from about 4 to 20 feet, are circular in cross section, and have a diameter of from about ¼ to 4 inches (preferably 1 to 2 inches). Reactor spatial orientation is not important, but is preferably vertical.

In such three reactor sequence, the pressure employed is sufficient to maintain liquid phase conditions in all reaction zones.

The tubular reaction zones are preferably mounted vertically and are oriented parallely to one another. The tubes are placed inside a common vessel or shell through which a coolant is circulatable to remove the heat generated by the hydrolysis reaction proceeding therein in operation of the process of this invention.

Coolant fluid on the shell side of each reactor is preferably circulating water which absorbs the heat of reaction by increasing its temperature as it flows through the shell. Preferably the temperature increases by about 5° to 10°F in circulating through the shell, though such increase can range from about 1° to 30°F or even more, as desired.

More generally, the fluid can be a hydrocarbon liquid, such as one selected from among thermal fluids marketed under various trade names, such as Dowtherm R (by the Dow Chemical Co.), or any mineral oil with a normal boiling point above about 200°F and a pour point below about 70°F.

Alternately, the heat of reaction can be removed by a boiling fluid on the shell side, where the boiling fluid is at constant temperature and the heat of reaction is removed by the latent heat of vaporization of the liquid. The liquid should preferably have a normal boiling point in the range of from about 90° to 150°F, more broadly from about 50° to 220°F. A suitable liquid here would be a fluorocarbon refrigerant sold under the name Freon 113 R by the DuPont Company which has a normal boiling point of 117.6°F., or the like.

Consequently, a three rotating reactor sequence not only allows a high degree of flexibility but also tends to maximize useful catalyst life. One feature of this three reactor sequence is that the temperatures of the respective stages are increasable as the catalyst deactivates so that conversion can be held at a desired constant level. Catalyst life would end when conversion can not be held up without going to excessively high temperatures that would or could cause side reactions.

The following Table I summarizes process variables for such a three reactor sequence under continuous steady operation:

Table I

| Reaction Zone** | Variables | Approximate Broad Range | Approximate Preferred Range |
|---|---|---|---|
| 1. | conversion of acrylonitrile to acrylamide (%) % acrylonitrile* in feed (rest of feed is water) weight hourly space velocity temperature (°F) | 15-45<br><br>25-75<br><br>1-10<br>100-250 | 20-40<br><br>30-40<br><br>2-6<br>160-210 |
| 2. | cumulative conversion of acrylonitrile to acrylamide (%) weight hourly space velocity temperature (°F) | 35-65<br><br>1-10<br>100-250 | 50-60<br><br>2-6<br>160-210 |
| 3. | cumulative conversion of acrylonitrile to acrylamide (%) weight hourly space velocity temperature (°F) | 65-99<br><br>1-10<br>120-300 | 70-90<br><br>2-6<br>180-250 |

*can include recovered acrylonitrile as recycle from stripping.
** The feed to zone two is the product from zone one, and the feed to zone three is the product from zone two.

In the three reactor sequence, when one desires to operate with one reactor out of operation (for whatever reason) with other reactors remaining in series, there are four possible modes of operation which can be employed in operating immediately prior to pulling such one reactor out of the system, as follows:

a. The two remaining stages can be run at the same conditions that existed in the first two stages immediately prior to pulling out one reactor. The consequence is reduced conversion at the same overall flow rate.
b. Same as "a", except that the system flow rate is reduced to partially or totally restore the conversion level lost by pulling out a reactor.
c. Same as "a" except that temperature is increased in one or both stages to partially or totally restore the conversion level lost by pulling out a reactor.
d. Combination of "b" and "c".

The following Table II summarizes process variables for such a two reactor sequence under continuous steady start operation using the same feed composition and reactor sequence covered in Table I:

Table II

| Reaction Zone* | Variables | Approximate Broad Range | Approximate Preferred Range |
|---|---|---|---|
| 1. | conversion of acrylonitrile to acrylamide (%) % acrylonitrile in feed (rest of feed is water) weight hourly space velocity temperature (°F) | 15-55<br><br>25-75<br><br>0.5-10<br>100-250 | 30-45<br><br>30-40<br><br>1-6<br>160-230 |
| 2. | cumulative conversion of acrylonitrile to acrylamide (%) weight hourly space velocity temperature (°F) | 35-99<br><br>0.5-10<br>120-300 | 50-90<br><br>1-6<br>160-250 |

*The Feed to zone two is the product from zone one.

Preferably in the practice of this invention it is preferred to employ catalysts whose activity is stable for a period of time sufficiently long to permit rather extended commercial continuous runs of hydrolysis according to this invention without catalyst deactivation. For example, it is preferred to use a catalyst which retains at least about 75 percent of its initial activity (as determined by the procedure of Example 1 below) for a period of at least about 500 hours when used in a reaction zone of a process embodiment of this invention, there being no necessity to raise the (normally constant, prechosen) reaction zone temperature.

Referring to FIG. 1, curve A is an idealized composite of various test runs and shows the relationship between contact time (in terms of the reciprocal of weight hourly space velocity, (the units on the abscissa being computed hours) versus the total percent conversion of acrylonitrile to acrylamide for a system using a catalyst with an activity of about 1 and where a single stage reaction zone is maintained at about 200°F and hydrolysis is carried to the point of about 80 percent conversion of starting acrylonitrile to acrylamide. At conversion rates higher than about 90 percent, the reaction rate is typically so slow as to make higher conversions economically and practically unattractive from the standpoint of a highly efficient continuous process operation.

The composite curve formed by individual curves $B_1$, $B_2$ and $B_3$ illustrates a three reaction zone process of the present invention also using a catalyst with an activity of about 1 and wherein the first reaction zone is operated at about 170°, the second reaction zone is operated at about 190°, and the third reaction zone is operated at about 215°F. Line C marks the end of zone 1 and the beginning of zone 2, and line E marks the end of zone 2 and the beginning of zone 3. Line D is a reference straight line connecting the 0 and 80 percent conversion points. An incremental conversion of acrylonitrile to acrylamide, based on starting feed, of 26.7 percent is achieved in each stage. In the first zone, there is thus achieved a conversion of about 26.7 percent at a reciprocal weight hourly space velocity of about 0.33 hours. At this same reciprocal weight hourly space velocity value in the single reaction zone a conversion of over 50 percent of acrylonitrile to acrylamide occurs (see the dotted line C in FIG. 1). Similarly, at the end of zone 2 a total conversion of about 53 ⅓ percent (see dotted line E) is achieved in contrast to that achieved in a single reaction zone (see curve A) where a total conversion of about 72 percent is achieved. A total of 80 percent conversion is achieved for both systems.

Figure 2:
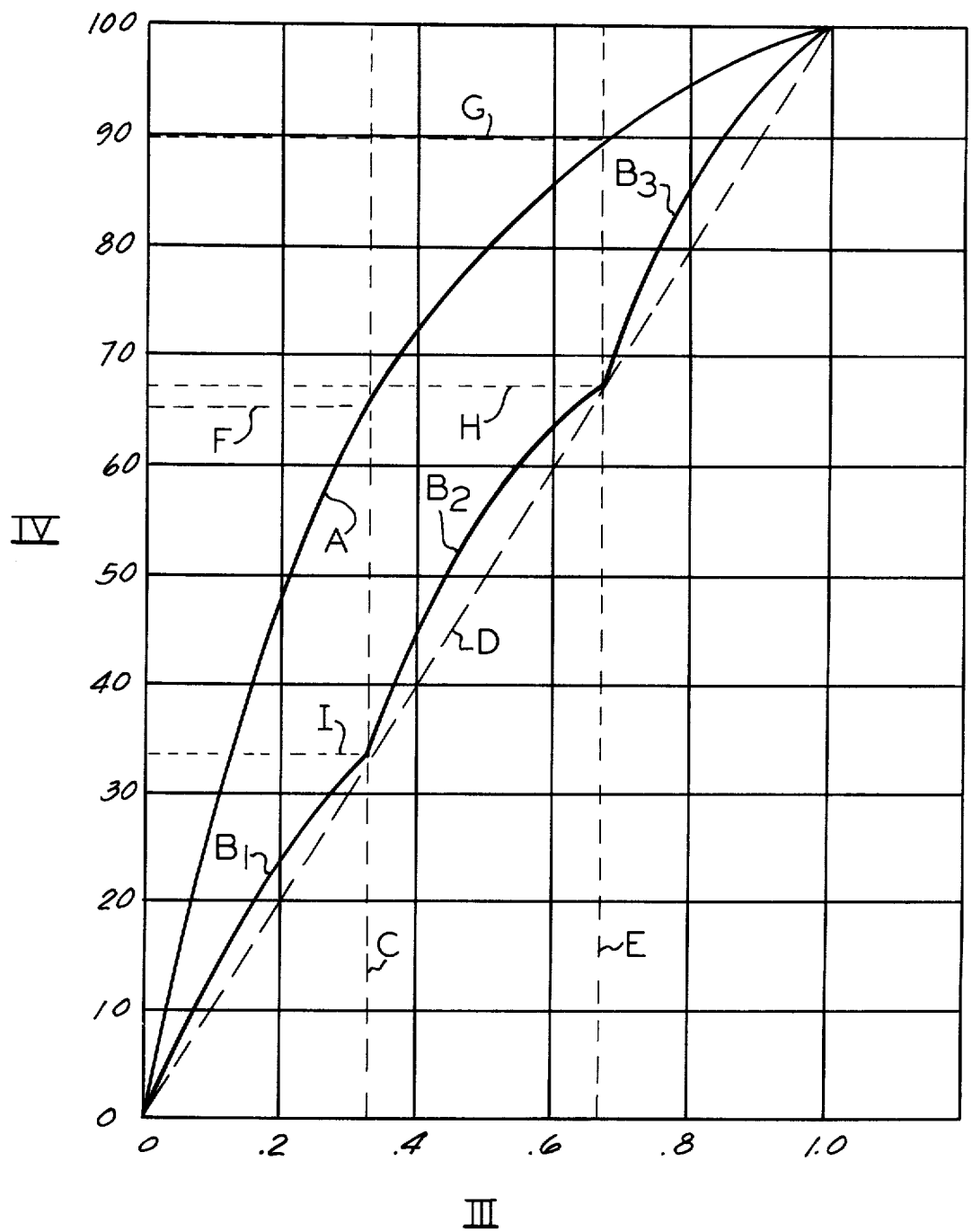
FIG. 2 shows plots illustrating cumulative heat evolved as ordinates (III) relative to varying contact times in hours (shown as the reciprocal of weight hourly space velocity) as abscissae (IV)

FIG. 2 illustrates the dependence of cumulative heat evolution on contact time in the preferred three zone case, and also in an idealized single zone case. Curve A in FIG. 2 illustrates the single zone case, and composite curve $B_1$, $B_2$, $B_2$ illustrates the preferred three zone case. This FIG. 2 is directly obtained from FIG. 1 by applying the relationship:

Heat evolved (Btu/hr) equals heat of reaction ($^{Btu}$/lbs.AN) times feed rate of acrylonitirile (lbs $^{AN}$/hr) times fractional conversion of acrylonitrile to acrylamide. (AN designates acrylonitrile).

FIG. 2 shows that, for the single zone case, 65 percent of the total heat evolution occurs in the first equal segment of the zone (see line C and F). 90 minus 65 equals 25 percent of the total heat evolution occurs in the second equal segment of the zone (see lines E and G) and 100 minus 90 equals 10 percent of the total heat evolution occurs in the third equal segment of the zone. In contrast, the three zone case shows 33 ⅓ percent of the total heat evolution occurring in each of the three equal sized contact zones (see lines H and I and also average line D).

The imbalance of heat evolution between equal segments of the one zone case is directly responsible for temperature control difficulties which are experienced in conducting the reaction in this manner. Heat is removed from the reaction zone to the cooling medium which surrounds the reaction zone by conduction and connection through the reaction zone to the wall of the vessel which surrounds the reaction zone, conduction through the wall of the vessel, and conduction and connection to the bulk of the cooling medium. As a first order approximation, it is widely known that the rate of heat transfer will be proportional to the temperature difference between the reaction zone and the cooling medium. Since the cooling medium is operated in a manner which for present illustrative discussion purposes may be regarded as being nearly isothermal, the temperature inside of the reaction zone will adjust itself to a value which results in the heat generated being transported to the cooling medium. If a high quantity of heat is evolved, in any segment of a reaction zone, the temperature of this segment must rise to a high temperature relative to the cooling medium. Conversely, a low quantity of heat is evolved in any segment of a reaction zone, the temperature of the segment will closely approach the temperature of the cooling medium. For the single zone example of FIG. 2 (se curve A), the heat evolved in segment 1 (before line C) is 65 divided by 10 or 6.5 times as great as the heat evolved in segment 3 (after line E). Hence, as an approximation, the temperature difference between segment 1 and the cooling medium must be 6.5 times as great as the temperature difference between segment 3 and the cooling medium, resulting in higher temperatures in the first segment than the third segment.

The following Table III summarizes the degree of imbalance which occurs between the three zones:

Table III

| Contact Time | PERCENT OF TOTAL HEAT EVOLVED | | Ratio of heat evolved in single zone case compared to 3 zone case. |
|---|---|---|---|
| | Single Zone | Three zone | |
| First third | 65 | 33⅓ | 1.95 |
| Second third | 25 | 33⅓ | .75 |
| Last third | 10 | 33⅓ | .30 |
| Total | 100 | 100 | |

A further characteristic of the reaction is that the rate of conversion is increased by higher temperatures, which will cause higher rates of conversion and heat evolution than even the prior point suggests in the first segment of the single zone case. Hence, the present invention provides a highly advantageous process.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification and drawings.

EXAMPLE 1

A reactor is formed of a double pipe heat exchanger design. The inner tube, which constitutes the reaction zone, is a five foot length of 304 S.S., schedule 10S pipe which has an inside diameter of 1.097 inch and an outside diameter of 1.185 inch. This pipe is vertically positioned and equipped to allow introducing the feed at the bottom and withdrawing product from the top. The inner tube is uniformly surrounded by a jacket which is provided with an inlet at the bottom of the jacket and an outlet at the top of the jacket to allow circulating an oil for removing the heat of reaction.

A thermowell of about ⅛ inch diameter is inserted from the top and runs the length of the inner pipe to allow temperature measurements to be made throughout the reaction zone.

When this reaction is used to determine activity of a catalyst, during operation of this reactor, acrylonitrile and water are separatedly pumped from volumetrically calibrated feed tanks, combined, heated, and introduced into the bottom of the reactor. The reactor is maintained under pressure as necessary to allow maintaining liquid phase conditions. Product leaving the reactor is cooled before reducing pressure to atmospheric. Product is collected in a final receiver.

The feed tanks are sparged with nitrogen for a brief time before the beginning of a run to minimize oxygen contained in the feeds to the reactor.

Samples of product are analyzed for weight % acrylamide, weight % acrylonitrile, and weight % water to determine conversion levels (100 weight percent total product weight basis).

The procedure to determine catalyst activity is as follows: A measured weight of catalyst is charged to a tubular reactor and a series of tests are run as previously described. The tests are run at different contact times with all other variables held constant as follows:

1. Arithmetic mean catalyst bed temperature of 210°F.
2. Feed composition 100 weight % basis of 35 weight % acrylonitrile and 65 weight % water.

Contact time is inversely measured as weight hourly space velocity (WHSV), which is defined as weight hourly feed rate divided by catalyst weight in the reaction zone.

The contact times are varied to bracket an 80 percent conversion level. The WHSV required for 80 percent conversion ($WHSV_{80}$) is estimated by graphical or statistical interpolation. The catalyst activity (a) is then calculated from the following expression:

$$a = 0.6 \ (WHSV_{80})$$

The ranges for catalyst activity are elsewhere herein indicated. All catalyst activity valves in this application are measured by the procedure described in this Example.

WHSV's in the range of 0.4 to 6.0 are useful starting points to bracket the space velocity required for 80 percent conversion ($WHSV_{80}$), the last being an abbreviation for weight hourly space velocity needed for 80 percent conversion.

EXAMPLE 2

Example demonstrating the production of a catalyst suitable for hydration of acrylonitrile to acrylamide by the process of the present invention.

Small ingots of a 50% copper, 50% aluminum alloy are crushed using a roll crusher and screened to obtain a 6 to 8 mesh particle size cut from the crushings. These 6 to 8 mesh alloy particles are then activated with caustic to form a granular Raney copper catalyst by the following procedure:

A reaction vessel of approximately 30 gal which is equipped with a cooling jacket and an agitator is charged with about 6.5 lbs of the 6–8 mesh alloy particles, 67 lbs of deionized water and about 0.08 lbs of dissolved gluconic acid and the vessel is maintained at about 85°F. Caustic in the form of an aqueous solution of 50 wt. % Na OH is then added to the mixture in the vessel continuously with stirring over a 5 hour period so that a total of 26.5 lbs. of 50% caustic is thus added to the vessel at the temperature indicated. After such caustic addition is completed, the vessel is maintained with stirring for an additional 5 hours. During the entire period of activation the temperature of the liquid in the vessel is maintained by adjusting the rate of coolant to the vessel jacket.

The product Raney copper granules thus produced are washed until wash water shows a neutral pH. These product washed granules are screened to remove fires smaller than 20 mesh and then stored under deionized water.

When evaluated for catalytic hydrolysis activity in the manner described in Example 1, this material is found to have an activity of about 1.0.

EXAMPLE 3

Example demonstrating the production of a catalyst suitable for hydration of acrylonitrile to acrylamide by the process of the present invention.

Small ingots of a 50% copper, 50% aluminum alloy are crushed using a roll crusher and screened to obtain a 6 to 8 mesh particle size cut from the crushings. These 6 to 8 mesh alloy particles are then activated with caustic to form a granular Raney copper catalyst by the following procedure:

A reaction vessel of approximately 30 gal. which is equipped with a cooling jacket and an agitator is charged with about 15 pounds of a 25 weight percent solution of NaOH. About 0.04 pounds of gluconic acid are dissolved in such solution. The product solution is maintained at about 70°F and a total of about 3 pounds of the alloy particles above prepared are added to this solution over a time of about 1.5 hours with agitation. Thereafter, agitation of the resulting system is continued for an additional time of about 2.5 hours. The mole ratio of NaOH to aluminum is estimated to be about 1.69. The system temperature during this entire procedure is maintained in the range from about 68° to 81°F.

The product Raney copper granules thus produced are washed until wash water shows a neutral pH. These product washed granules are screened to remove fines smaller than 20 mesh and then stored under deionized water.

When evaluated for catalytic hydrolysis activity in the manner described in Example 1, this material is found to have an activity of about 0.3.

EXAMPLE 4

Example illustrating a low temperature, low conversion single reaction zone process.

The reactor used is as described in Example 1 above. Process variables and run results are summarized as follows:

Table IV

| | |
|---|---|
| Catalyst weight | 1060 gms |
| Catalyst size | 6–20 Tyler mesh |
| Catalyst activity | 1.0 |
| Catalyst type | Raney copper |
| WHSV | 0.81 |
| % ACN in Feed | 34.6 |
| Jacket Temp. | 155–156 |
| Avg. Bed Temp. °F | 170 |
| Peak Bed Temp. °F | 173 |
| Conversion ACN to AM (%) | 60 |
| Concentration of AM in Reactor Product (%) | 28 |

The catalyst used is that made in Example 2 above. This example shows that improved control of temperature is achieved. Observe that the peak temperature is only 30° above the minimum temperature. However, the concentration of acrylamide (AM) in the reaction product is only 28 percent (which is a relatively dilute solution) and also the conversion is only about 60 percent.

EXAMPLE 5

Example illustrating a multi-zone conversion.

In this example, the catalyst employed is that made in Example 2 above is utilized and a three reaction zone conversion process is carried out in accordance with the teachings of this invention but using the reactor of Example 1. The procedure involves operating this reactor first under a reaction zone simulating a zone 1 or stage 1, the reactor effluent is collected and held, except that reactor effluent during start up and shut down operation conditions is discarded. Next the same reactor is run under stage 2 or second reaction zone conditions and the effluent so produced is collected except that, as before, effluent from start up conditions and shut down conditions is discarded. Finally, the reactor is run under stage 3 or third reaction zone conditions using the effluent collected from the second reaction zone conditions.

Thus, a first run for a stage 1 using acrylonitrile and water feeds is undertaken. Product at stage 1 conditions is collected and decanted to separate the two phases present. The next set of conditions for a stage 2 are undertaken using the product from stage 1 conditions as the feed. The two phases are fed to the reactor with two pumps (one for each phase) in the same ratio as they had been produced in stage 1. Product from stage 2 is a single phase. This product from stage 2 conditions is used as feed for a third reactor stage. The variables and results are summarized in the following Table V:

Table V

| Test | Stage 1 | Stage 2 | Stage 3 |
|---|---|---|---|
| WHSV | 3.10 | 3.18 | 3.10 |
| Overall feed composition (%) | | | |
| acrylonitrile | 37.6 | 25.5 | 16.7 |
| acrylamide | 0.0 | 17.9 | 30.6 |
| water | 62.4 | 56.6 | 52.7 |
| Jacket temperature | 164–166 | 182–183 | 201–205 |
| Average Bed Temperature | 183 | 195 | 213 |
| Peak Bed Temperature | 187 | 198 | 217 |
| Cumulative Conversion of ACN to AM (%) | 36 | 59 | 82 |

The concentration of acrylamide in the final product is 41% and that of acrylonitrile is about 7% (all by weight)

This example shows many of the advantages of the present invention.

EXAMPLE 6

Example illustrating of difficulty of temperature control in single zone process.

A reactor as described in Example 1 is employed. The reactor is charged with 1040 grams of Raney copper catalyst having an activity of about 0.8 and a 6 to 20 Tyler mesh size range; this catalyst is prepared similarly to that of Example 2 (above). The variables and the results for each of the two test runs using this same catalyst are as follows:

Table VI

| Variable | Run A | Run B |
|---|---|---|
| WHSV | 0.95 | .98 |
| % ACN* in feed | 33.9 | 34.1 |
| Jacket Temp. (°F) | 210–209 | 210–209 |
| Feed Temp. (°F) | 84 | 102 |
| Avg. Bed Temp. (°F) | 221 | 225 |
| Peak Bed Temp. (°F) | 231 | 238 |
| Conversion ACN to AM** (%) | 93 | 90 |
| Concentration of AM in Reactor Product (%) | 42 | 41 |

\* ACN = acrylonitrile
\*\*AM = acrylamide

It is found that isothermal conditions could not be established at the desired bed temperature of 220°F by changing either jacket or preheat temperature. A temperature peak of 10° to 18°F above the desired 220°F generally occurred at a distance of 10–16 inches from the feed composition inlet to the bed.

EXAMPLE 7

Example illustrating exotherm under adiabatic operating conditions using a single reaction zone.

The reactor of Example 1 is modified to allow adiabatic operation by draining the oil out of the jacket and evacuating the jacket to minimize heat transfer. The catalyst used is similar to that of Example 2 above. In addition, the jacket and reactor ends are insulated with two one inch layers of rock wool insulation. Electrical heating tape is installed between the layers of insulation. Thermocouples are installed between the inner layer of insulation and the jacket wall.

During operation of the unit the power to the electrical heating tape is adjusted to minimize the temperature difference between the electrical tape and the jacket. This minimizes heat losses from the unit and allows closely approximating adiabatic operation.

Process variables and results are summarized below:

Table VII

| | |
|---|---|
| Catalyst activity | 0.4 |
| Catalyst charge (gms) | 550 |
| Catalyst size | 6 to 20 Tyler mesh |
| WHSV | 1.99 |
| Feed Composition % | |
| acrylonitrile | 24.7 |
| water | 75.3 |
| Bed temperatures °F | |
| inlet | 170 |
| outlet | 277 |
| Conversion of ACN to AM (%) | 82 |
| Concentration AM in Product (%) | 26.8 |

The adiabatic winding temperature is, in fact, found to average 44°F lower than the jacket skin temperature. From this and the estimated thermal conductivity of the insulation of 0.22 BTU/hr ft$^2$ °F it is estimated that only about 11 percent of the heat of reaction is lost by conduction through the insulation.

Based on this data, the heat of reaction is estimated to be about −510 BTU/lb acrylonitrile.

This procedure shows that the reaction is highly exothermic. Even with such relatively high reaction temperatures only about 27 percent concentration is obtained which is unsatisfactory for present purposes.

EXAMPLE 8

Example illustrating use of a dilute acrylonitrile solution as feed to a single reactor.

The reactor is as described in Example 1. The catalyst similar to that of Example 2. Variables and results are summarized in Table VIII below:

Table VIII

| | |
|---|---|
| Catalyst activity | 0.7 |
| Weight of Catalyst charge | 960 grams |
| WHSV | 4.9 |
| Feed composition % | |
| acrylonitrile | 9 |
| water | 91 |
| Average bed temperature °F | 205 |
| Conversion ACN to AM (%) | 80 |
| Concentration of AM in Product (%) | 10 |

It is possible to closely control reaction temperature; however, the acrylamide concentration in the product is only about 10 percent which is unacceptable for present purposes.

EXAMPLE 9

Example demonstrating surprisingly fast rate of conversion between 0 and 30 percent conversion relative to the conversion rate above 60 percent conversion.

The reactor used is as described in Example 1, and the catalyst used similar to that described in Example 2 above and has an initial activity of about 1.0. About 1059 grams of such catalyst are charged to the reactor.

The following runs are conducted at different catalyst contact times with all other variables being held essentially constant.

Table IX

| Test | Temperature (°F) | Contact Time, or 1/WHSV | % Acrylonitrile in feed | % Conversion to amide |
|------|------|------|------|------|
| A | 192 | .62 | 34.2 | 65.0 |
| B | 190 | 1.27 | 34.3 | 81.6 |
| C | 189 | .155 | 34.4 | 30.9 |

The data show that between 0 and 30 percent conversion, the rate of conversion proceeds at an average rate of about 200 percent hr, while between 65 and 80 percent conversion, the rate of conversion is substantially reduced to an average of only about 25 percent/hr.

EXAMPLE 10

The hydration of acrylonitrile to acrylamide is accomplished in a sequential three identical reactor configuration. Each reactor is of shell and tube design, and has multiple tubes which are each 1½ inches in diameter and 8 feet long. The tubes of each reactor are oriented parallel to each other and are spaced from one another on a 1½ inch triangular pitch pattern. The tubes of each reactor are placed inside a common shell which is equipped with inlet and outlet nozzles for circulation of water to allow removing the heat of reaction. The bottoms of the tubes mounted in each reactor shell are open to a common bottom chamber into which the reactants are introduced to each stage. The tops of the tubes mounted in each reactor are open to a common top chamber from which the product is withdrawn from each reactor. The reactors are mounted in a position which aligns the axes of the parallel tubes in a substantially vertical position.

The bottom chamber of the reactors is filled with ½ inch inert alumina balls which serve as a support for the catalyst. A Raney copper catalyst of the type produced in Example 2 above and having an activity of about 1.0 is packed inside the tubes of each reactor, filling them from top to bottom.

Each reactor is equipped with a cooler and a circulation pump which are interconnected in a manner which allows circulating water through each reactor shell, as illustrated in FIG. 3. Controls are provided to allow closely controlling the circulating water temperature.

The reactor system is also equipped with two separate pumps for feeding acrylonitrile and water to the first reactor. A preheater is also provided to preheat the fresh water reactant feed to a designated level.

Acrylonitrile and water are pumped by the respective feed pumps to the first reactor. The respective rates at which each of the acrylonitrile and water are pumped are adjusted to give a total feed rate that results in about 3.0 WHSV in each reactor. The individual feed rates for water and acrylonitrile are adjusted to give an overall fresh feed composition of 35 percent by weight acrylonitrile and 65 percent by weight water. The preheater on the fresh water feed is adjusted so that the temperature of the combined feeds going into the first reactor is 170°F.

The effluent from the first reactor is used as feed to the second reactor, and the effluent from the second reactor is used as feed to the third reactor.

Water is circulated in the shell of each of the reactors. The temperature of the water circulating through each reactor shell is individually adjusted to obtain and maintain the desired temperature in the catalyst bed of each reactor. In this manner, adjustments are made to obtain an average temperature in the catalyst bed of the first reactor of 170°F, an average temperature in the catalyst bed of the second reactor of 190°F, and an average temperature in the catalyst bed of the third reactor of 215°F.

The entire reactor system is maintained under 100 PSIG pressure to maintain liquid phase conditions.

After reaching steady state conditions, the cumulative conversions of acrylonitrile to acrylamide is about 27 percent in reactor 1 product, about 53 percent in reactor 2 product, and about 80 percent in the final product from the third reactor.

The final product from the third reactor is approximately 38% acrylamide, 7% acrylonitrile, and 55% water. No impurities are detected at levels equal to or greater than 0.1 percent.

EXAMPLE 11

The hydration of acrylonitrile to acrylamide is accomplished in the three reactor configuration of Example 10. A Raney copper catalyst similar to that of Example 3 is used to fill the tubes of the three reactors. The catalyst as indicated has an activity of approximately 0.3.

Acrylonitrile and water are pumped by the respective feed pumps to the first reactor. The respective rates at which each of the acrylonitrile and water are pumped are adjusted to give a total feed rate that results in about 3. - WHSV in each reactor. The individual feed rates for water and acrylonitrile are adjusted to give an overall fresh feed composition of 35 percent by weight acrylonitrile and 65 percent by weight water. The preheater on the fresh water feed is adjusted so that the temperature of the combined feeds going into the first reactor is 200°F.

The effluent from the first reactor is used as feed to the second reactor, and the effluent from the second reactor is used as feed to the third reactor.

Water is circulated in the shell of each of the reactors. The temperature of the water circulating through each reactor shell is individually adjusted to obtain and maintain the desired temperature in the catalyst bed of each reactor. In this manner, adjustments are made to obtain an average temperature in the catalyst bed of the first reactor of 200°F, an average temperature in the catalyst bed of the second reactor of 225°F, and an average temperature in the catalyst bed of the third reactor of 250°F.

The entire reactor system is maintained under 100 PSIG pressure to maintain liquid phase conditions.

After reaching steady state conditions, the cumulative conversion of acrylonitrile to acrylamide is about 27 percent in reactor 1 product, about 53 percent in reactor 2 product, and about 80 percent in the final product from the third reactor.

The final product from the third reactor is approximately 38% acrylamide, 7% acrylonitrile and 55% water. No impurities are detected at levels equal to or greater than 0.1 percent.

EXAMPLE 12

In the course of operating the process of Example 11, reactor 1 is removed from operation for maintenance. Reactor 2 and 3 continue operation under modified conditions at a reduced efficiency. The same catalyst of Example 11, having an activity of 1.0, remains in use in reactors 2 and 3.

The same feed rates of Example 11 are used for acrylonitrile and water. Fresh feed is fed to reactor 2. The effluent from reactor 2 remains the feed to reactor 3.

The circulating water temperature of reactor 2 is lowered to achieve an average catalyst bed temperature in reactor 2 of about 180°F. Similar adjustments are made in reactor 3 to achieve an average bed temperature of about 205°F. The preheater is adjusted to give a combined feed inlet temperature to reactor 2 of about 180°F.

After achieving steady state operation, the acrylonitrile in the feed is about 35 percent converted to acrylamide in reactor 2 effluent, and about 70 percent converted to acrylamide in the final product from reactor 3. The final product composition is approximately 33% acrylamide, 11% acrylonitrile, and 56% water.

EXAMPLE 13

Example illustrating use of stripping to concentrate a reaction product and remove unconverted acrylonitrile.

A continuous stripping unit is constructed by fitting a 10 liter resin flask with an electric heating mantel, an agitator, temperature indicator, vacuum gauge, and vacuum pump. Provisions are made for continuously introducing feed and withdrawing product. The vapors are directed through a Vigreaux column above the flask and externally condensed.

A product prepared in the manner of Example 5 having the following analysis is stripped in this unit:

| Component | wt % (100 wt % basis) |
| --- | --- |
| water | 57.0 |
| acrylonitrile | 8.7 |
| acrylamide | 34.3 |

The feed is continuously fed to the unit, and the rate of heat to the unit is adjusted to strip off a desired quantity of acrylonitrile and water.

The resin flask is run approximately half full of liquid while stripping. The temperature of the liquid in the flask in maintained at 68°–70°C during operation of the unit by maintaining a vacuum of 21.5 in. of Hg.

The overheads split into two phases after condensing. Between 350 and 430 cc/hr of water-rich phase and 130–200 cc/hr of nitrile-rich phase are collected. The composite product sample is analyzed and found to have the following composition:

| Component | wt. % (100 wt %basis) |
| --- | --- |
| water | 54.3 |
| acrylonitrile | .4 |
| acrylamide | 45.2 |

Less than about 0.1 weight percent by-products or impurities are detected in the acrylamide solution by vapor phase chromatography.

The product from this run and other similar runs is successfully employed in making high quality acrylamide polymers and copolymers of acrylamide and sodium acrylate.

I claim:
1. A process for catalytically hydrolyzing acrylonitrile to acrylamide under liquid phase conditions comprising continuously passing sequentially through at least two tubular reaction zones in a plug flow manner a liquid reactant feed composition comprising from about 25 to 75 wt. % acrylonitrile and from about 25 to 75 wt. % water on a 100 wt. % total reactant feed composition basis, each one of said reaction zones
   a. containing a fixed catalyst bed,
   b. the catalyst comprising each of said beds being characterized by having an initial activity of at least about 0.25 based upon a starting feed composition of 35 wt. % acrylonitrile and 64 wt. % water, total composition basis, using an arithmetic mean catalyst bed temperature of 210°F., a catalyst bed volume of about 50 cubic inches and an evaluation weight hourly space velocity which is sufficient to produce 80 percent conversion of acrylonitrile to acrylamide, said process
   a'. being conducted substantially isothermally at temperatures in the range of from about 100° to 300°F. and
   b'. having a system weight hourly space velocity in the range of from about 0.1 to 10 hours $^{-1}$,
the interrelationship between said system weight hourly space velocity and the temperature, respectively, in each one of said reaction zones being such that the percentage conversion of acrylonitrile to acrylamide in each one of such reaction zones ranges from about 0.5 to 1.5 times said total system conversion divided by the total number of said reaction zones.

2. The process of claim 1 wherein there are two of said reaction zones.

3. The process of claim 1 wherein there are three of said reaction zones.

4. The process of claim 1 wherein there are four of said reaction zones.

5. The process of claim 1 wherein said catalyst is in the form of particles ranging in size from about 0.01 to 0.49 inch.

6. The process of claim 1 wherein said catalyst is in the form of particles ranging in size from about 0.02 to 0.3 inch.

7. The process of claim 1 wherein said catalyst is a coppercontaining catalyst.

8. The process of claim 7 wherein said catalyst is a Raney copper catalyst.

9. The process of claim 1 wherein said catalyst has such an initial activity of from about 0.25 to 2.

10. The process of claim 1 wherein said catalyst has such an initial activity of from about 0.45 to 1.5.

11. The process of claim 1 wherein said system weight hourly space velocity ranges from about 0.5 to 2.

12. The process of claim 1 wherein said temperatures range from about 150° to 260°F, wherein each of said reaction zones is maintained at a substantially constant temperature, and wherein each successive reaction zone is maintained at a higher temperature than the preceding reaction zone.

13. The process of claim 1 wherein said total system conversion is at least about 60 percent.

14. The process of claim 1 wherein the product liquid mixture is subjected to stripping to recover therefrom unreacted acrylonitrile.

15. The process of claim 14 wherein said recovered acrylonitrile is recycled back to at least one of said reaction zones.

16. The process of claim 14 wherein said recovered acrylonitrile is recycled back to the first of said reaction zones in admixture with said feed composition.

17. The process of claim 14 wherein said stripping is carried out at temperatures ranging from about 100° to 212°F. at pressures ranging from about 50 to 760 mm Hg.

18. The process of claim 14 wherein the so stripped product comprises on a 100 weight percent basis from about 40 to 60 weight percent acrylamide and from about 40 to 60 weight percent water.

19. The process of claim 1 wherein said interrelationship between said system weight hourly space velocity and said isothermal temperature ranges from about 0.7 to 1.3.

20. The process of claim 1 wherein the total system conversion of starting acrylonitrile to acrylamide is at least about 75 percent.

21. A process for hydrolyzing with a fixed bed catalyst acrylonitrile to acrylamide comprising continuously passing sequentially through three tubular reaction zones substantially isothermally under liquid phase conditions at a system weight hourly space velocity ranging from about 0.1 to 10 hours$^{-1}$ a reactant composition comprising from about 25 to 75 weight percent acrylonitrile and from about 25 to 75 weight percent water on a 100 weight percent total composition basis, there being a conversion of starting acrylonitrile to acrylamide after passing through said first reaction zone of from about 15 to 45 percent, a conversion of starting acrylonitrile to acrylamide after passing through second said reaction zone of about 35 to 65 percent, and a conversion of starting acrylonitrile to acrylamide after passing through said third reaction zone of from about 65 to 99 percent.

each of said reaction zones containing a bed of Raney copper catalyst which has an initial catalytic activity of at least about 0.25 based upon a starting feed composition of 35 weight percent acrylonitrile and 65 weight percent water, total composition basis, an arithmetic mean catalyst bed temperature of 210°F, using a catalyst bed volume of about 50 cubic inches and an evaluation weight hourly space velocity which is sufficient to produce 80 percent conversion of acrylonitrile to acrylamide, said first reaction zone being maintained at a temperature ranging from about 100° to 250°F., said second reaction zone being maintained at a temperature ranging from about 100° to 250°F., and said third reaction zone being maintained at a temperature ranging from about 120° to 300°F, said process resulting in a total system conversion of starting acrylonitrile to acrylamide of at least about 60 percent, the interrelationship between the system weight hourly space velocity and the temperature, respectively, in each one of said reaction zones being such that the percentage conversion of acrylonitrile to acrylamide in each one of such reaction zones ranges from about 0.5 to 1.5 times said total system conversion divided by the total number of said reaction zones.

22. The process of claim 21 wherein said reactant composition after passing through said third reaction zone is subjected to stripping to remove therefrom substantially completely all unreacted acrylonitrile thereby to produce an aqueous solution of from about 40 to 60 weight percent acrylamide with the balance up to 100 weight percent being water.

23. The process of claim 22 wherein acrylonitrile so removed is recycled to said reactant composition, as fed to said first zone.

24. The process of claim 21 wherein the order of respective ones of said reaction zones is changed in the sequence of such passage 0f said reactant composition therethrough, thereby permitting rates of deactivation of catalyst in individual ones of said reaction zones to be minimized.

25. The process of claim 21 wherein said system weight hourly space velocity ranges from about 0.5 to 2 hours$^{-1}$.

26. The process of claim 21 wherein said reactant composition comprises from about 30 to 40 weight percent acrylonitrile and from about 60 to 70 weight percent water, and said conversion of starting acrylonitrile to acrylamide after passing through said first reaction zone of from about 20 to 40 percent, said converstion of starting acrylonitrile to acrylamide after passing through said second reaction zone of from about 50 to 60 percent, and said conversion of starting acrylonitrile to acrylamide after passing through said third reaction zone of from about 70 to 90 percent.

27. The process of claim 21 wherein, in each of said reaction zones, said Raney copper has such an initial catalytic activity of from about 0.45 to 1.5

28. The process of claim 21 wherein, in each of said reaction zones, said catalyst is in the form of particles ranging in size from about 0.01 to 0.49 inch.

29. The process of claim 21 wherein said catalyst is in the form of particles ranging in size from about 0.02 to 0.3 inch.

30. The process of claim 21 wherein said catalyst is a copper-containing catalyst.

31. The process of claim 30 wherein said catalyst is a Raney copper catalyst.

32. The process of claim 21 wherein said total system conversion is at least about 75 percent.

33. The process of claim 21 wherein said interrelationship between said system weight hourly space velocity and temperature ranges from about 0.7 to 1.3.

34. In an improved process for hydrolyzing with a fixed bed catalyst acrylonitrile to acrylamide of the type employing three tubular reaction zones through which in normal process operation a reactant composition comprising from about 25 to 75 weight percent acrylonitrile and from about 25 to 75 weight percent water on a 100 weight percent total composition basis is passed sequentially, substantially isothermally, and under liquid phase conditions, each of said reaction zones containing a bed of Raney copper catalyst which has an initial catalytic activity of at least about 0.25 based upon a starting feed composition of 35 weight percent acrylonitrile and 65 weight percent water, total composition basis, using an arithmetic means catalyst bed temperature of 210°F., a catalyst bed volume of about 50 cubic inches and an evaluation weight hourly space velocity which is sufficient to produce 80 percent conversion of acrylonitrile to acrylamide, the improvement which comprises the steps of a. removing from service one of said three tubular reaction zones, and
b. passing said reactant composition sequentially, substantially iosthermally, and under liquid phase conditions through the remaining two of said three tubular reaction zones at a system weight hourly space velocity in the range from about 0.5 to 10 hours$^{-1}$ while maintaining the first of said remaining two reaction zones at a temperature range from about 100° to 250 °F. and the second of said remaining two reaction zones at a temperature ranging from about 120° to 300°F., the conversion of starting acrylonitrile to acrylamide after passing through the first of said remaining two reaction zones being from about 15 to 55 percent, and being from about 35 to 99 percent after passing through the second of said remaining two reaction zones.

* * * * *